United States Patent [19]
Hwa et al.

[11] 3,939,135
[45] Feb. 17, 1976

[54] COFUSED RESINS AND THEIR PREPARATION

[75] Inventors: Jesse C. H. Hwa, Stamford, Conn.; Paul Kraft, Yonkers; Leonard Feiler, Riverdale, both of N.Y.

[73] Assignee: Stauffer Chemical Company, New York, N.Y.

[22] Filed: Feb. 8, 1971

[21] Appl. No.: 113,689

Related U.S. Application Data

[63] Continuation of Ser. No. 682,384, Nov. 13, 1968, abandoned, which is a continuation-in-part of Ser. No. 585,052, Oct. 7, 1966, abandoned.

[52] U.S. Cl. ......... 260/87.1; 260/2.5 M; 260/2.5 H; 260/2.5 HA; 260/2.5 HB; 260/30.4 R; 260/32.8 R; 260/33.2 R; 260/33.4 R; 260/34.2; 260/92.8 A; 260/96 R
[51] Int. Cl.$^2$ .................... C08F 6/14; C08F 6/24
[58] Field of Search ......... 260/88.7 B, 87.1, 87.5 C, 260/87.5 E, 80.6, 92.8 A, 88.2 S, 80.7, 34.2, 63 HA, 63 R, 85.5 P, 86.3, 89.1, 89.5 S, 94.9 F, 94.9 GD, 78.5 B, 78.5 T, 91.1 S, 96 R, 88.1 R, 88.1 P, 89.7 S, 93.5 A, 32.8 R, 82.1, 2.5 M; 264/126, 117

[56] References Cited
UNITED STATES PATENTS

| | | | |
|---|---|---|---|
| 2,806,256 | 9/1957 | Smith-Johannsen | 260/2.5 M |
| 3,020,268 | 2/1962 | Schutze | 260/93.7 |
| 3,055,297 | 9/1962 | Leeds | 101/327 |
| 3,111,506 | 11/1963 | Roussillon et al. | 260/87.5 |
| 3,179,646 | 4/1965 | Ingraham | 260/92.8 |
| 3,183,201 | 5/1965 | Shimeha et al. | 260/31.2 |
| 3,245,970 | 4/1966 | Drayer | 260/91.7 |
| 3,255,132 | 6/1966 | Reinecke | 260/23 |

*Primary Examiner*—John Kight, III

[57] ABSTRACT

Aqueous suspensions of discrete particles of polymer, for instance polyvinyl latices, are heated with solvents which are at least partially water-miscible, particularly certain shortchain ketones, until the polymer is agglomerated to the desired degree. Various water-soluble inorganic metal salts, especially alkali metal and alkaline earth metal halides and sulfates, may also be added to facilitate the agglomeration. Novel macromolecular resins of high absorptivity are thus produced, comprising the fine particles of polymer cofused in a reticulated structure, the degree of cofusion being controlled at will by the process conditions selected.

10 Claims, 21 Drawing Figures

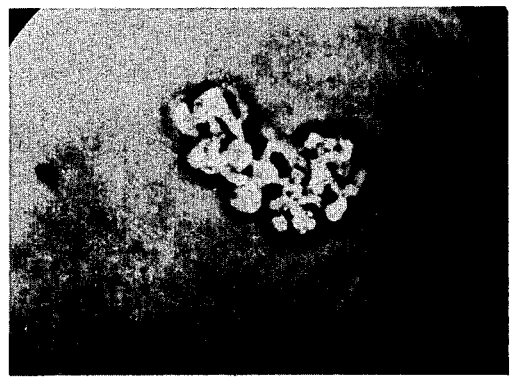
FIG. I
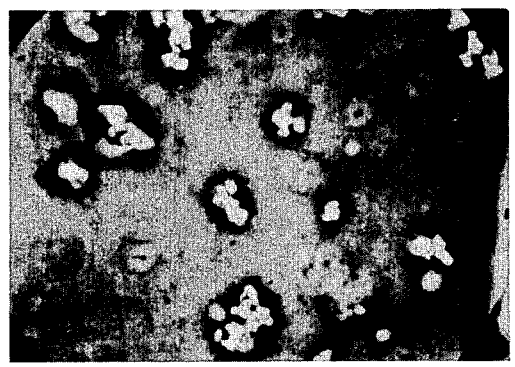
FIG. II
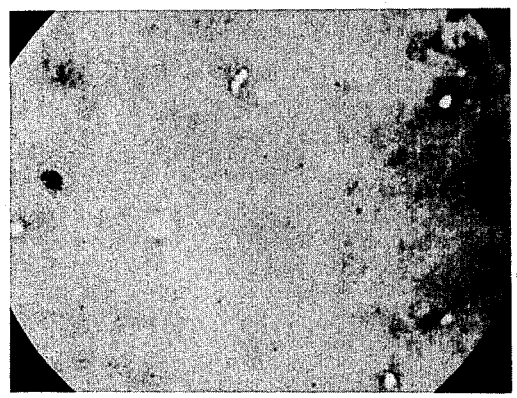
FIG. III

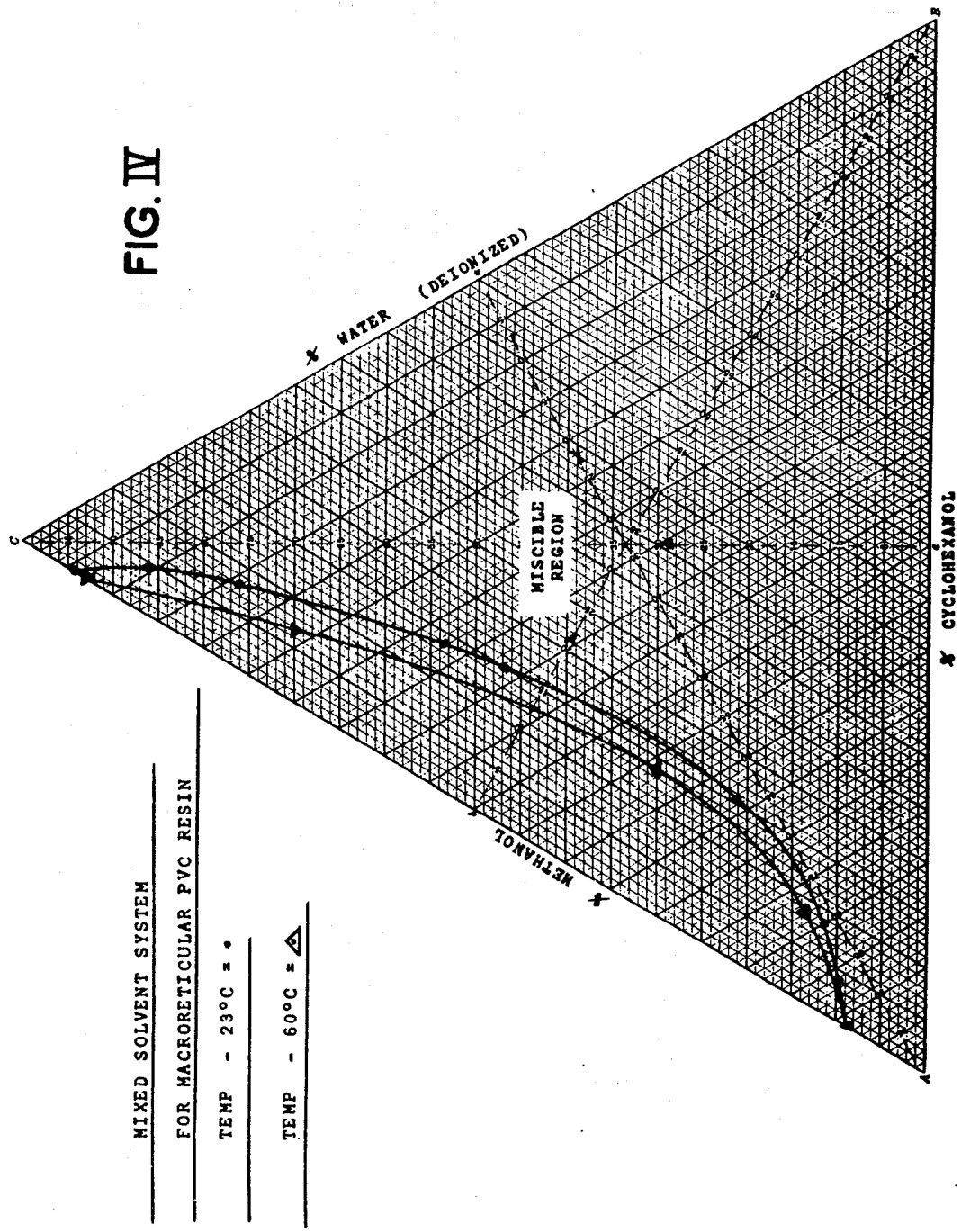

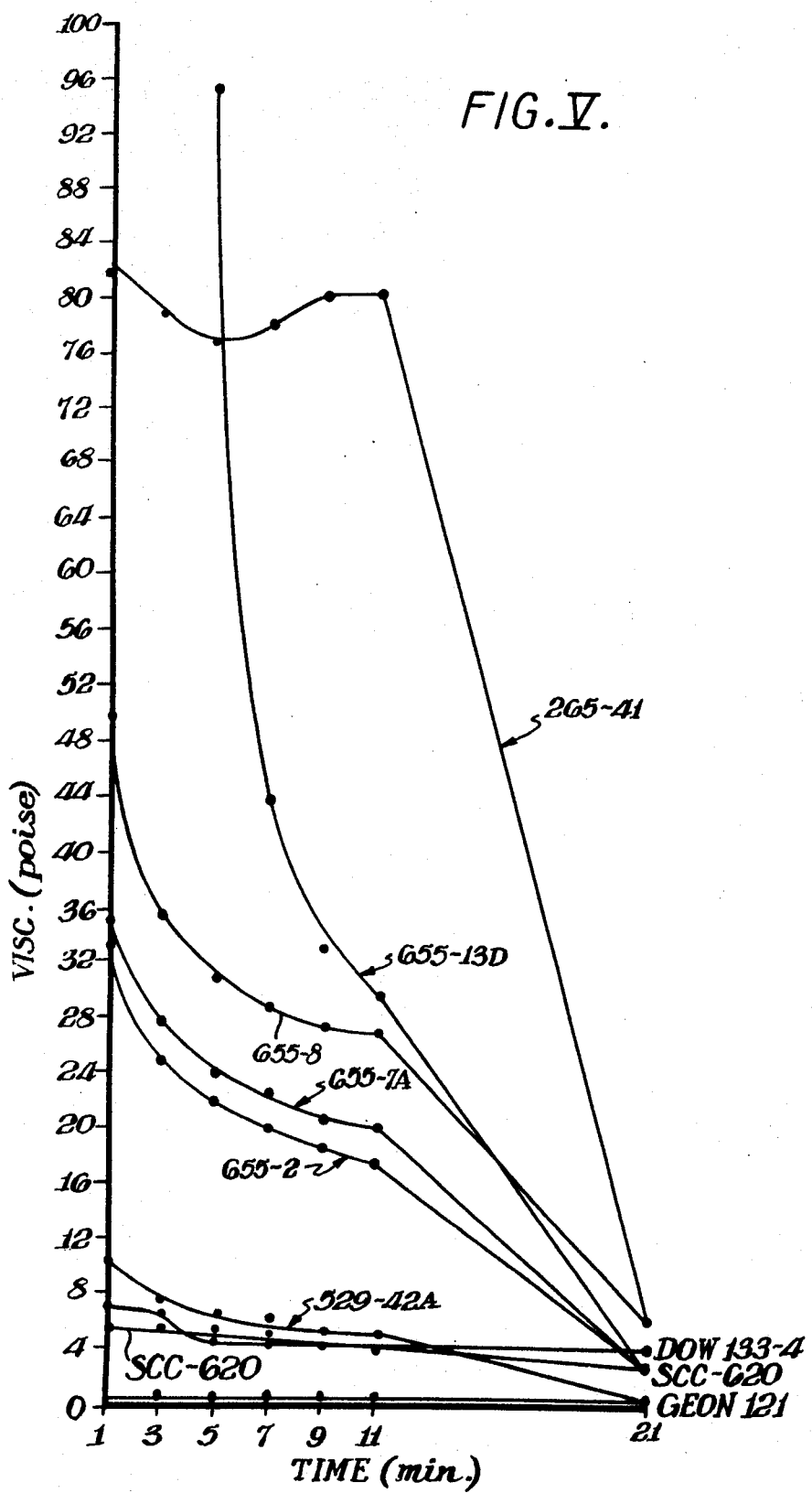

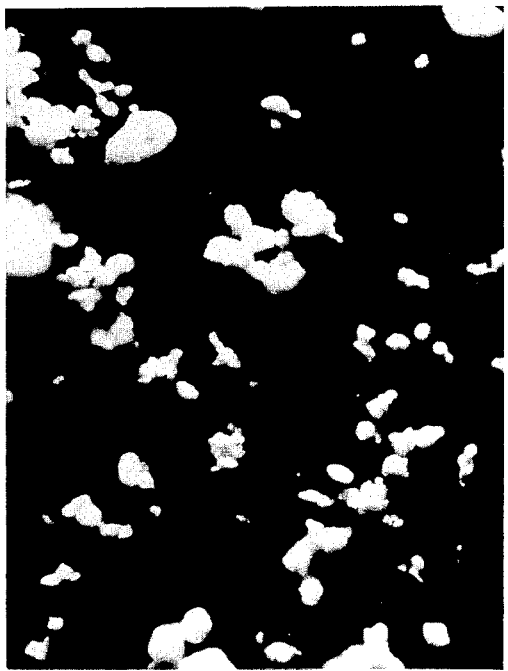
FIG VI
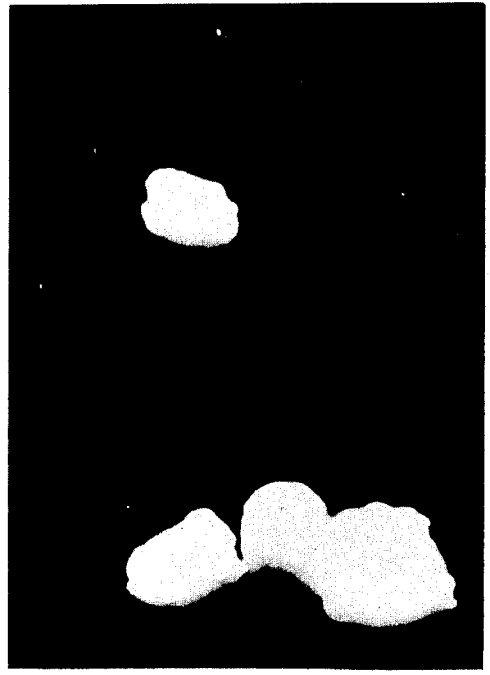
FIG VII
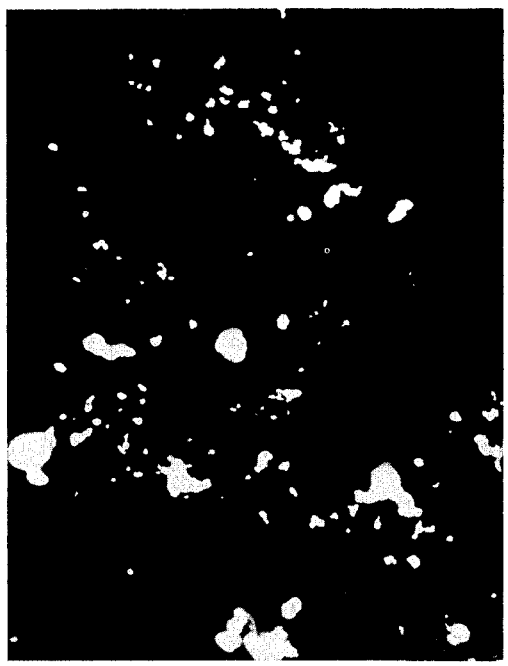
FIG VIII
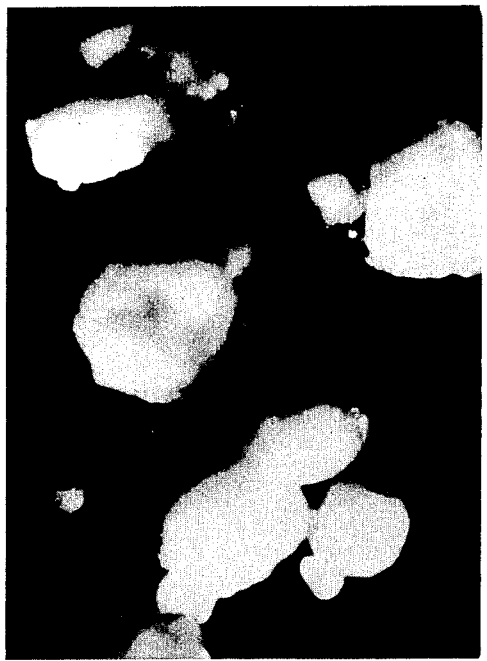
FIG IX

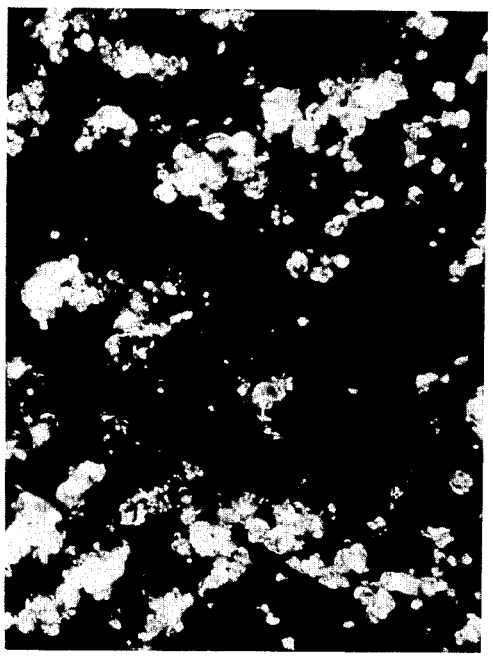
FIG X
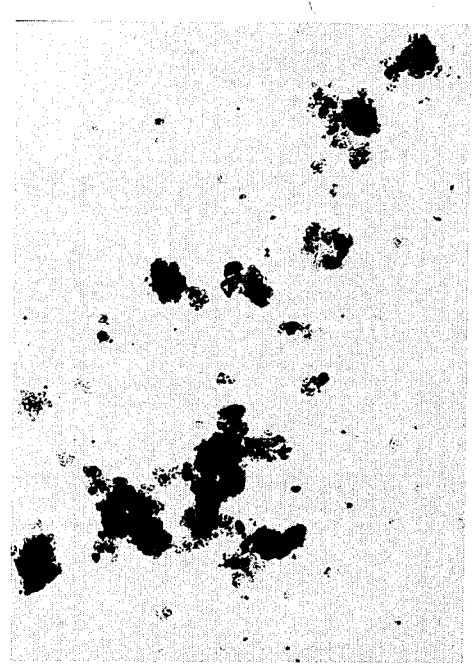
FIG XI
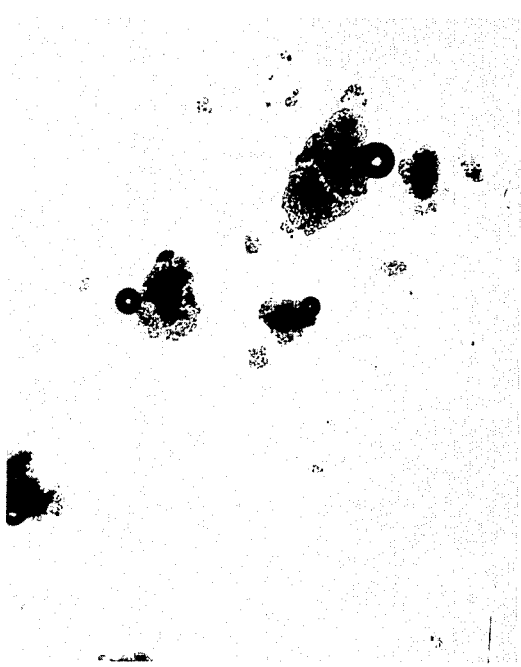
FIG XII
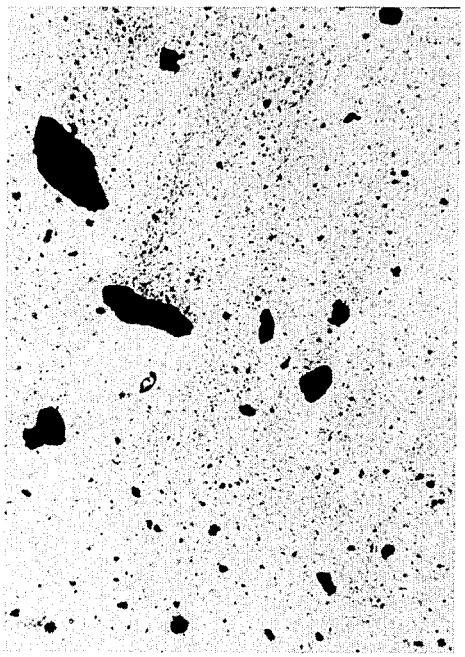
FIG XIII

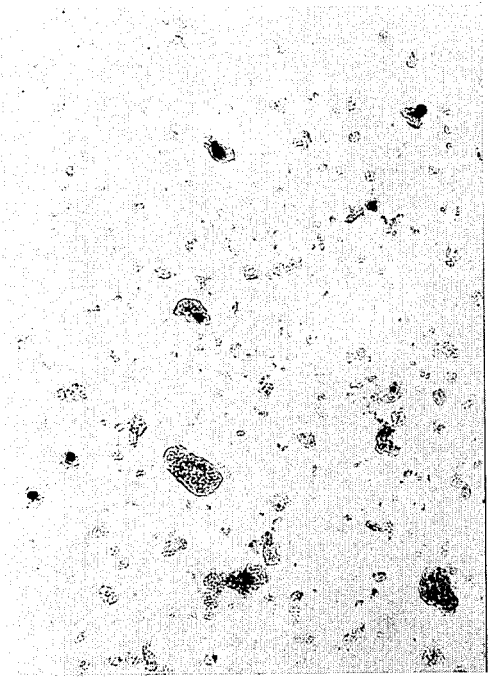
FIG XIV
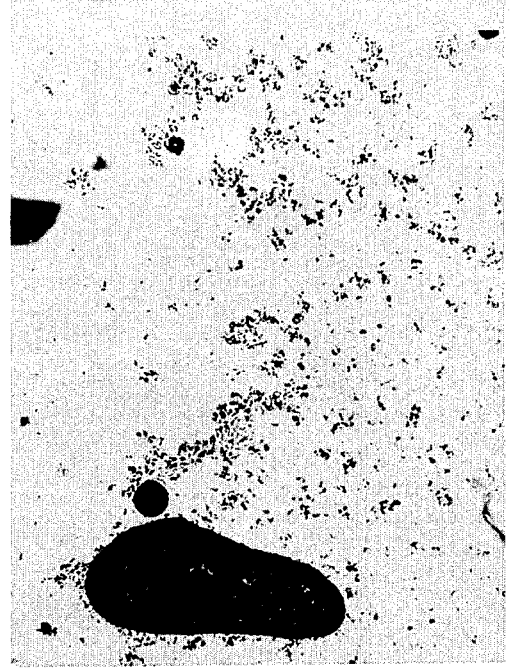
FIG XV
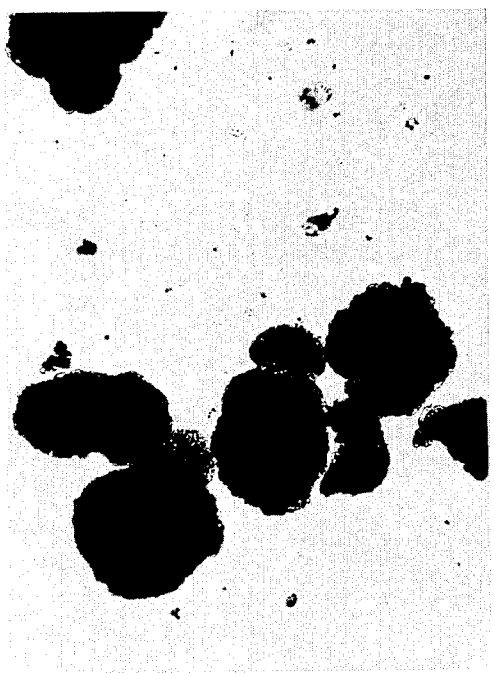
FIG XVI
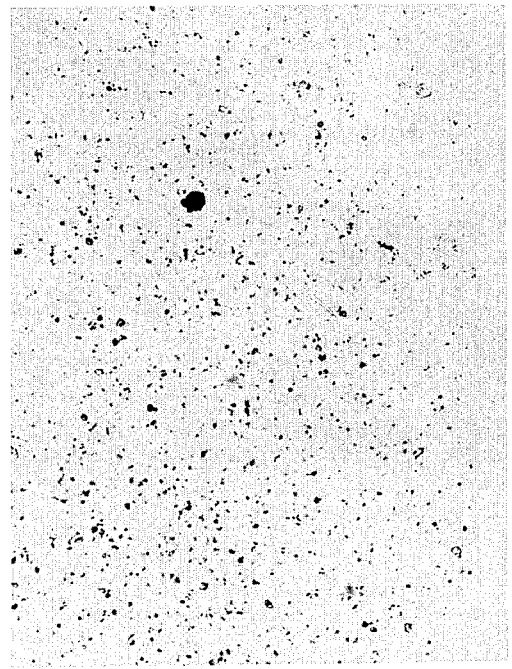
FIG XVII

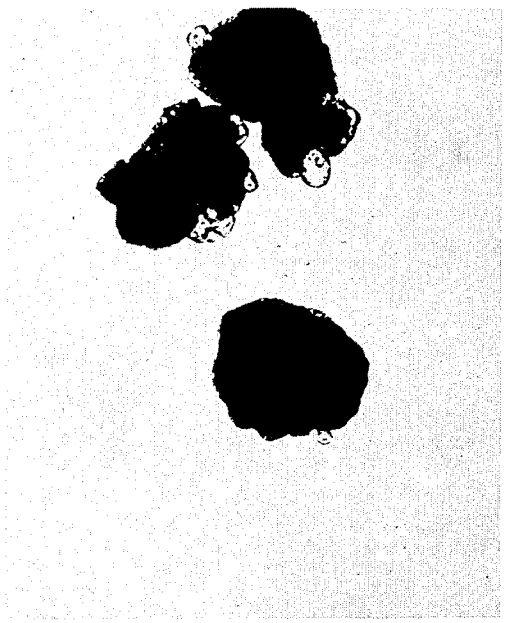
FIG XVIII
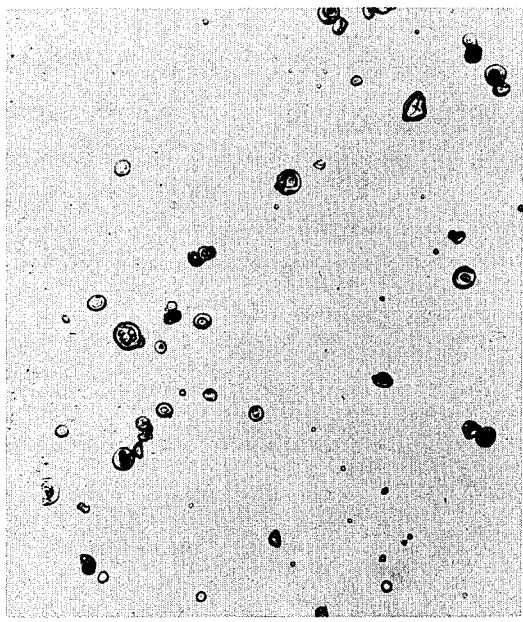
FIG XIX
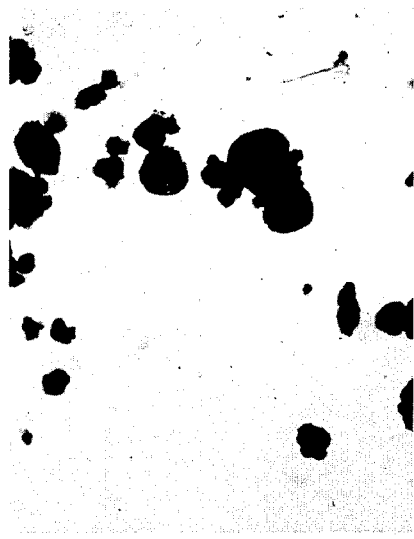
FIG XX
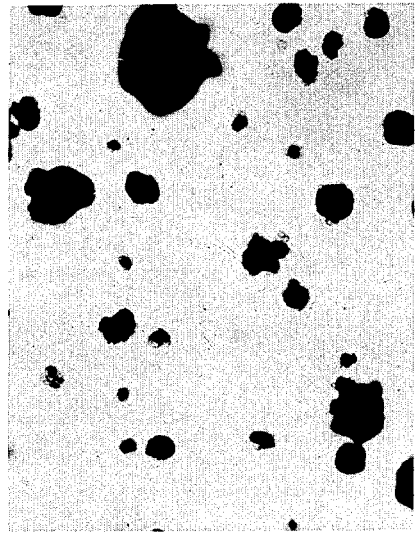
FIG XXI

COFUSED RESINS AND THEIR PREPARATION

CROSS-REFERENCE TO RELATED APPLICATION

This application is a streamlined continuation of our copending application Ser. No. 682,384, filed Nov. 13, 1968, now abandoned, which in turn is a continuation in part of our copending application Ser. No. 585,052, filed Oct. 7, 1966, now abandoned.

BACKGROUND OF THE INVENTION

This invention relates to macromolecular polymer structures and methods for their preparation. It also concerns compositions containing these macroreticular products and in particular highly absorptive resins and plastisols.

Blotter-type resins are known. They are generally prepared by forming large particles of a synthetic polymeric resin and exploding the particles by suddenly reducing pressure within the system. This results in a sponge-like structure wherein the interstices are fairly continuous and the solid matrix is hard and horny, much like coral. This type of resin is able to soak up liquids such as plasticizers, hence its popular term a "blotter resin."

It is among the objects of this invention to provide novel cofused resin structures which are especially adapted to use instead of blotter resins because they have the ability to absorb and hold large quantities of plasticizers and other liquids. A further object is to provide plastisols and similar compositions, with or without pigmentation, which are in the form of apparently dry, free-flowing granules, but which contain trapped within the interstices of the reticulated structure the plasticizer necessary to convert them to plastisols upon the application of stress or shear. Additional objects are to devise methods for making and using these new types of cofused resins.

SUMMARY OF THE INVENTION

These and other objects are realized by the present invention, which in its broader aspects comprises fusing together fine, discrete polymer particles under controlled conditions until the desired degree of cofusion is achieved, by intimately commingling a stable aqueous emulsion or suspension of the polymer, particularly a vinyl polymer, and a water-miscible organic solvent system and heating to achieve conditions under which the polymer is partially but not wholly solubilized. The polymer particles are thereby softened to the point where they fuse together, either lightly or extensively depending on the time and temperature of heating and the type of solvent. These confused particles then precipitate and the resulting macroreticular resin may be recovered from the liquid phase, dried and finished in any of the usually accepted ways.

BRIEF DESCRIPTION OF THE DRAWINGS

FIG. I is illustrative of a typical polyvinyl chloride (PVC) resin having the novel reticulated structure obtained by this process;

FIGS. II and III depict a typical prior art PVC dispersion resin (Geon 121, product of Goodrich). All three figures are photomicrographs at the same magnification (1000x). The macroreticular resin of FIG. I appears as a relatively large discrete particle in a matrix remarkably free of broken bits and primary particles. On the other hand, the prior art resin of FIG. II appears as agglomerates with a background of small particles. FIG. III shows the result when the agglomerates of FIG. II are broken up by mere stirring or other physical disturbance of a very gentle type. (Such treatment of the structures of FIG. I does not change their character, thus demonstrating the fact that they are not simple "agglomerates" but a new type of discrete structure in which the polymer particles are actually fused together.)

FIG. IV is a phase diagram of a typical solvent system for PVC and FIG. V illustrates graphically representative resin aggregate strengths as measured by the Brookfield method hereafter described.

FIGS. VI through X are top-illuminated photographs at 188x magnification of various prior art resins and of a typical resin of the present invention: FIG. VI - the product of Example IV; FIG. VII - a commercial blotter resin (product of Dow-No. 133-4); FIG. VIII - Geon 121 again; FIG. IX - a commercial suspension G. P. resin (product of Stauffer-SCC No. 620); FIG. X - a commercial extender resin (product of Goodyear - "Pliovic"M-50).

FIGS. XI through XXI are transmission-illuminated photographs, again at 188x magnification, identified as follows: FIG. XI - product of Example I; FIG. XII - product of Example II; FIG. XIII - The "pigmentsol" product of Example III B; FIG. XIV - product of Example IV again; FIG. XV - The milled product of Example V (the large globule at the bottom of the field is merely an air bubble); FIG. XVI - Dow 133-4 blotter resin again; FIG. XVII - Geon 121 again; FIG. XVIII - SCC 620 again; FIG. XIX - "Pliovic" M-50 again; FIGS. XX and XXI - products of this invention prepared by the combined solvent-salt process of Examples VI and VII.

DETAILED DESCRIPTION OF THE INVENTION

The choice of polymer for this process may vary widely. For instance, one may use a vinyl halide, e.g. a homopolymer prepared by the emulsion polymerization of vinyl chloride in an aqueous system until a stable latex of primary particle size results. Instead of such latices, polymers prepared by other processes may also be used, for instance dispersion type polymers. The desired emulsions or suspensions may be prepared by redispersing preformed polymer particles in an aqueous system, for example after they have been spray-dried or otherwise recovered as a dry powder or granules. Such a reconstituted polymer suspension is then mixed and heated with the critical water-miscible solvent system according to the process of the present invention, just as is a latex obtained directly by emulsion polymerization. Generally whatever the source of the polymer dispersion, whether latex or suspension, the concentration of polymer in it is preferably between about 5 and about 50%, preferably about 20 to 30%, by weight.

Instead of one monomer, mixtures of monomers may be polymerized to obtain latices of copolymers in lieu of homopolymers which are then utilized to make the new resins. Typical examples of polymers useful in this invention are the vinyl and vinylidene halides, especially the chlorides and bromides; vinyl ketones; vinyl aromatic compounds like styrene and its copolymers and blends such as acrylonitrile-butadiene-styrene systems; vinyl sulfide copolymers; vinyl esters such as vinyl acetate; esters of alcohols with mono- and polybasic acids, e.g. methyl and ethyl acrylates, methyl and ethyl methacrylates, maleic acid and fumaric acid esters; unsaturated ethers and amides such as cetyl vinyl ether, acrylamides and acrylonitriles; and alkylenes like ethylene and propylene. Substantially any polymer which is thermoplastic can be successfully treated by the process of this invention.

The choice of organic solvent system for this new process is a particularly critical one. The solvent should be one in which the polymer per se is at least partially soluble, and yet should not be one which, in the aqueous system and with the heat employed in this process, actually does more than soften the polymer particles. The softened particles in the aqueous matrix can then "glue" themselves together at various contact points to provide the novel cofused resins of this invention. If on the other hand the organic solvent-heat treatment fully solubilizes the polymer in the latex, an amorphous coagulum precipitates which merely consists of large polymer agglomerates having neither the desirably high absorptivity nor the reticulated structure of cofused resins. It has been found that a system consisting essentially of an at least partially water-miscible ketone having from 3 to 6 carbon atoms and a lower alkanol (1 to 5 carbons) which is miscible with both the ketone and the water is especially satisfactory. One may employ for instance as the alkanol from about 0 to about 10 parts by volume of methanol, ethanol or isopropanol per part by volume of the ketone. Representative of the most desirable ketones for treating polyvinyl latices are cyclohexanone (water-miscible to the extent of about 8%), acetone and methyl ethyl ketone. Some ketones can be used as the sole solvent, particularly acetone and cyclohexanone. Other solvents notably useful with polyvinyl chloride and polyvinyl bromide are tetrahydrofuran, dioxane, dimethylacetamide, dimethylsulfoxide and mixtures of these. Those skilled in the polymerization art, given applicants' teachings herein, can readily select particularly desirable organic solvents and heating temperatures to be used with any given polymer to achieve whatever degree of particle cofusion is desired. For instance, to obtain a resin wherein the particles are very strongly bonded together, one might select a polyvinyl chloride latex and cyclohexanone as the solvent. To obtain a lightly cofused PVC resin one might prefer acetone to cyclohexanone, but with many methacrylate latices one would probably avoid choosing this solvent. Where two organic solvents are mixed, the proportions of them to employ are of course interdependent with the polymer system chosen and the specific temperature and time of treatment. All these process conditions can be easily adjusted so that the polymer particles agglomerate at the desired point to obtain the desired confused resin.

According to one preferred embodiment of this invention, a solvent system of cyclohexanone and methanol has been found to be most effective with aqueous polyvinyl chloride latices in obtaining resins with the desired macroreticular structure. All combinations of these solvents and water in the miscible region of the phase diagram of FIG. IV are operable. It has been observed that by varying the composition within this miscible region, one can obtain varying degrees of surface fusion. Thus cofused resins may be prepared which can, if desired, be broken down easily. By operating in a region of higher cyclohexanone, on the other hand, a more permanent blotter-type resin may be formed.

It has been found particularly desirable, especially in large scale commercial operation, to incorporate in the polymer suspension-organic solvent system a relatively minor proportion by weight of an electrolyte which is a water-soluble metal salt. The combination of the salt with the heat and organic solvent facilitates the softening and agglomeration of the polymer particles, thus speeding and controlling the cofusion into the desired reticulated structure. Preferred salts for treatment of polyvinyl halides are alkali metal and alkaline earth metal halides, sulfates, phosphates and nitrates, and in particular sodium and potassium chlorides and sulfates. Such a salt is used in proportions generally ranging between about 10 and 50% by weight of the polymer solids content in the suspension, and preferably between about 15 and 30% by weight.

One skilled in the art can also readily choose the particular conditions of temperature and time under which the polymer suspension and the solvent system are interreacted. As above noted, the temperatures and time are interdependent and also dependent upon the solvent system and the polymer chosen and their proportions. Of course, a temperature below the boiling point (at whatever pressure chosen) but above the freezing point of the solvent system should be used. For instance, when a cofused or "CF" polyvinyl chloride resin is in preparation, a relatively small proportion of solvent will suffice if the temperature is somewhat above about 70°C (the approximate softening temperature of PVC); but more solvent is required at lower temperatures in order to achieve the desired degree of cofusion in the same period of time. Conversely, with the poorer solvents and the solventelectrolyte systems, higher temperatures are desirable.

If enough solvent and reaction time are provided, even room temperature can be used successfully, but naturally some heat is desirable to accelerate the reaction. Again using PVC resin preparation as an example, when acetone or cyclohexanone and methanol is the solvent system of choice, the temperature of heating should be about 40° to 100°C and preferably 50° to 85°C, and the time of the heating should be rather long, e.g. about ½ to 2 hours. On the other hand, when cyclohexanone is used alone, heating for only 5 minutes at 150°C under pressure is sufficient. It is often desirable to use refluxing conditions to avoid loss of the solvents and water.

The importance of heating as one of the conditions of the new process is well illustrated by the following comparative test:

To 154 grams of PVC latex (32.5% solids) were added 240 grams of methanol, 150 grams of acetone and 100 grams of $H_2O$. The latex coagulated at once, was stirred for 10 minutes at room temperature and then filtered through 15 cm No 541 Whatman filter paper in a Buchner funnel attached to a standard laboratory vacuum line. Filtration time = 7 min. 35 sec. When this experiment was repeated but the mixture stirred and heated for 2 hours at 75°C before filtering by the same technique, the filtration time was only 30 seconds. It is noteworthy that this improved filtrability also aids materially in the ease of recovery of these new resins from the solvent system in which they are formed.

The reticulated resins precipitated by this new process are recovered by any means well known in the art, for instance, centrifuging, washing with water or hot methanol, tumble-drying, evaporating off residual solvents, etc. The final products are characterized and distinguished from hitherto known resins by many properties, particularly their microscopic appearance, their bulk densities, their surface areas, the relative permanence of bonding at the points of fusion of the primary particles composing them as measured, e.g. by their shear-resistance or shear-convertibility, and their absorptivity. For instance, the following table shows bulk densities of three of the new cofused polyvinyl chloride resins as compared to a commercially available dispersion-grade PVC resin prepared by conventional emulsion polymerization (again Geon 121) and to other respresentative prior art resins prepared by various techniques. The standard test described in ASTM D-1182 "Bulk Density Apparent" was used for this comparison.

|  | Density |  |
|---|---|---|
| SCC 620 (Stauffer suspension resin) | 48.76 | g/100 ml |
| Dow 133-4 (blotter resin) | 36.12 | " |
| Geon 103 (Goodrich suspension resin) | 54.12 | " |
| Diamond 744 (suspension resin) | 56.40 | " |
| Pliovic M-50 (Goodyear extender resin) | 40.76 | " |
| Geon 121 (Goodrich dispersion resin | 30.24 | " |
| CF 494-2 | 26.64 | " |
| CF 494-10 | 24.68 | " |
| CF 494-11 | 22.76 | " |

The CF resin 494-2 was prepared by heating the PVC latex emulsion with acetone for four hours at a temperature from 75° to 85°C, CF 494-10 was obtained by treatment with a mixture of acetone and methyl alcohol for four hours at a temperature from 65° to 68°C, and CF 494-11 by treatment with acetone and sodium chloride for the same period at a temperature from 75° to 85°C. It is clear that all three of these novel resins differ markedly in bulk density from even the prior art resin nearest to them in primary particle size and process of manufacture, the Geon 121. These test results are also of interest in illustrating the variations in bulk densities which can be achieved at will among these new products by varying the solvent systems and heating temperatures chosen.

The particle size distribution for each of these test resins is as follows:

| SCC 620 | 20 to 100 | microns |
| Dow 133-4 | 40 to 135 | " |
| Geon 103 | 100 to 130 | " |
| Diamond 744 | 20 to 60 | " |
| Pliovic M-50 | 18 to 40 | " |
| Geon 121 (with two maximum distribution ranges respectively at 0.10 to 0.26 microns and 0.39 to 0.78 microns) | 0.06 to 1.18 | " |
| CF 494-2 | 10 to 35 | " |
| CF 494-10 | 10 to 20 | " |
| CF 494-11 | 10 to 40 | " |

Surface area of the cofused resin products is preferably measured by the "BET method," i.e. the method developed by Brunauer, Emmet and Teller and described in Chapter 12, "Scientific and Industrial Glass Blowing and Laboratory Techniques," Barr & Anhorn (Instruments Publishing Co. 1959). Comparative mean specific surface areas for representative resins of the prior art and the new CF resins by the BET technique are as follows:

| Average suspension resin | 0.09 | $M^2/g$ |
| Blotter resin (Dow 133-4) | 0.9 | $M^2/g$ |
| Average CF resin | 2.7 | $M^2/g$ |

-continued

| Average dispersion resin (Geon 121) | 4.3 | $M^2/g$ |

Note especially the new product's greatly increased surface area as compared to the so-called blotter resin. From these data it is clear that, while the cofused resins can be advantageously used to replace blotter resins in many applications because of their extreme absorptive capacity, they are not themselves blotter resins per se. Nor can they be considered either suspension resins or dispersion resins. Rather they constitute an entirely new class of resins which in their most important characteristics are clearly differentiated from the several prior art resin categories.

Another important means by which the new cofused resins are differentiated from those hitherto known, and also a means by which individual CF resins may be distinguished from each other, is by measurement of their aggregate strength, i.e. the force required to shear the resins, converting them to their primary discrete particles by breaking them apart at their points of fusion. The prior art blotter resins, for instance, are so firmly aggregated that they are generally not shear-convertible at all. A dispersiongrade resin such as Geon 121, on the other hand, may consist of agglomerates, not aggregates, so loosely bound by static charges rather than fusion that little or no measurable force is needed to shatter its structure.

Two techniques have been developed for measuring the force required to shear the new cofused resins into their primary discrete particles and thus compare their aggregate strengths with those of the prior art resins: (a) Dry Strength, using an instrument modified for this purpose, Tester Model TT, manufactured by Instron Corp., Canton, Mass.; and (b) Wet Strength, adapting a Wells-Brookfield plate and cone rheometer Model 200-HBT-2X, manufactured by Brookfield Engineering Laboratories, Stoughton, Mass. Both techniques are in effect measuring the strength of the interparticle fusion bond in the resin aggregate.

a. Aggregate Strength, Dry

This measurement is made using a 2 gram resin sample within a one inch diameter cylindrical cavity die with a tight fitting top plunger, subjected to compression in the Instron Tester. The Instron is set up with the D compression cell, chart 10 inches per minutes, 1000 lbs. full scale and crosshead at 0.1 inches per minute. The total area under the curve from 50 lbs. to 1000 lbs. is determined and called A. The distance from the 500 lb. intercept to the 1000 lb. intercept is called B. The quantity $\alpha$ is reported where $\alpha = (A)(B)(.1)$. A higher number indicates stronger interparticular bonds requiring more force to break apart the agglomerates. Nonconverting prior art resins such as the suspension and dispersion types have a low alpha value since they rapidly assume their final compacted form. Blotter resin which can compact its irregular shape has a higher value. The shear-convertible resins all have alpha values even higher, since the value rises with the strength of the interparticle bond.

weighed and the amount of alcohol that would be absorbed by 100 grams of resin is calculated and reported. Correlation between the alcohol and the DOP titrations is good, with the alcohol method giving higher values.

TABLE

| Sample | Size in μ | Bulk den. g/ml | Porosity (phr) Alc. | Porosity (phr) DOP | α | β | Notes |
| --- | --- | --- | --- | --- | --- | --- | --- |
| SCC-620 G.P. resin | 110–170 | .59 | 40 | | 7.4 | 4.1 | |
| Geon 121 dispersion resin | .2–1.5 | .30 | 40 | | 3.7 | 0.1 | |
| Dow 133-4 blotter resin | 200–250 | .36 | 60 | | 31.1 | 2.8 | |
| CF Resins(PVC) | | | | | | | |
| 529-42A low acetone | 2.5–75 | | 140 | | 26.0 | 14.2 | shear sensitive |
| 655-2 low temp. | 2.5–25 | | 190 | | 36.1 | 45.0 | shear convertible |
| 655-7A high acetone | 1–10 | | 200 | 130 | 57.4 | 48.8 | shear convertible |
| 655-13D high acetone | 1–50 | .16 | 240 | 170–200 | 59.8 | 123. | shear convertible |
| 655-8 high acetone | 1–50 | .17 | 230 | 170 | 71.8 | 65.2 | shear convertible |
| 265-41 cyclohexanone | large | .21 | 250 | | 93.3 | 154. | shear resistant | b. Aggregate Strength, Wet

In this technique, a slurry of resin in an excess of a carrier fluid, e.g., 2 ethylhexyl phthalate (also known as dioctyl phthalate or DOP), is subjected to varying shear, and the effect on the viscosity of the slurry measured.

One gram of resin is added with minimum stirring to 3 grams of DOP. This is gently stirred with a wooden applicator stick to assure homogeneity.

The slurry is placed in the sample holder of the rheometer. The gap between cone and plate is set to 25 microns. The speed is set at 2 rpm. The motor is energized and viscosity readings are taken after one minute and after eleven minutes. The speed is increased at 20 rpm. for 9 minutes and then returned to 2 rpm. A reading at 21 minutes is taken. If readings are taken at intermediate times, e.g., 3, 5, 7, and 9 minutes, then results may be plotted as viscosity versus time as hereafter shown. A beta value is reported where: $\beta = 1$ min. visc. $-11$ min. visc. $+2$ (11 min. visc. $-21$ min. visc.) or $\beta = 1$ min. visc. $+ 11$ min. visc. $- 2$ (21 min. visc.). $\beta$ is used to rank the various resins, a higher $\beta$ indicating more resistance to shear.

Results comparing the CF and prior art resins by both techniques are shown in the table below under the headings $\alpha$ and $\beta$. Porosities reported in this table were determined thus:

Two grams of isopropanol or of DOP are weighed into a 50 ml beaker and the resin added slowly with minimal stirring with a wooden applicator stick. The end point is reached when the paste no longer sticks to the bottom of the beaker. Back titration is performed if necessary by adding an additional weighed amount of alcohol. This latter procedure does lower reproducibility, which otherwise is quite good. The final paste is As mentioned above, by the second or modified Brookfield technique one can also compare resins graphically by plotting viscosity versus time, giving a curve like that of Figure V. The dispersion resin Geon 121 on this curve has constant low viscosity. Due to surface abrasion, a blotter resin like Dow 133-4 shows a slight early decrease in viscosity, followed by a levelling off to a limiting value higher than Geon 121. Shear-sensitive CF resins like 529-42A have been partially broken down before the test begins, so start with medium viscosity and drop to a value near Geon 121. The more shear-resistant CF resins start higher and drop quickly, as with 655-8 and 655-13D. Resin 265-41, the most strongly fused, i.e., highly shear resistant, CF product does not convert during the early part of the test, but does so when the higher speed is used between the eleven and twenty minutes times.

The confused polyvinyl resins of this invention are distinguished from the various classes of prior art resins, such as those tabulated above, by their peculiar combination of properties. For instance, their primary particle size averages approximately 0.03 –2.0 microns (diameter). their surface area as measured by the previously described BET method is generally at least about 2 square meters per gram, and their maximum bulk density (ASTM-D1182 method) is about 30 grams per 100 ml. Those polyvinyl CF resins which are shear-sensitive usually range in wet aggregate strength, as measured by the modified Brookfield test, between about $\beta = 8$ and $\beta = 30$; those which are shearconvertible generally range between about $\beta = 31$ and about $\beta = 130$; and those which are shear-resistant have a wet strength of greater than about $\beta = 130$, normally up to $\beta = 200$ or more. All three types of polyvinyl CF resins are characterized by dry aggregate strengths of at least about $\beta = 20$, as measured by the above-described Instron test, the alpha value generally increasing as the resin's resistance to shear, i.e., the aggregate strength, increases.

Those new resins which are polyvinyls are capable of absorbing large amounts of plasticizer at ordinary room temperatures and still retaining their apparently dry, free-flowing character. For instance, cofused PVC resins can absorb up to 200% of their weight of DOP but remain dry. Depending on the conditions of fusion, resin having the plasticizer taken up in it exhibits varying degrees of permanence. Again using the lower alkanol: ketone solvent system are exemplary, generally the lower the proportion of the ketone in the system the more the product lends itself to conversion to a conventional, liquid plastisol. The dry, plasticizer-containing resin under these conditions we have termed "instant plastisol". It is not of course a true plastisol itself, because it is not a liquid. However, it is in essence a plastisol precursor in the sense that it is convertible to a standard plastisol simply by the application of a shearing force. The severity of shearing must of course be interdependent with the tightness with which the polymer particles of new macroreticular resin are fused together and thus hold on to the absorbed plasticizer. Those resins are usually chosen for the preparation of plastisol precursors which have wet aggregate strengths in the range of $\beta = 8$ to $\beta = 130$.

This property of instantly converting to a liquid plastisol upon simple shearing renders this type of the new cofused resins particularly valuable for a variety of uses, for instance as carriers for chemicals, as glass and wood laminates and in other types of adhesives, as "dry" lubricants and binders, pressuresealing gaskets, films and sheeting. As a plastisol or pigmentsol per se, this type of resin premixed with plasticizer and containing pigment if desired can be shipped and handled as a dry powder at less cost than conventional liquid plastisols. The "barrier effect" permits separate, "dry" storing of two reactive chemicals and their reaction together in situ whenever the cofused resin carrier is sheared to release them.

Furthermore, simple grinding of the cofused resin products results in clean, dispersion-grade resins such as have not been obtainable before from emulsion polymerizations. These milled products form very highgrade films characterized by good stability and low haze. Thus it can be seen conversely that the new process of this invention is also useful as a method of purifying resins obtained by emulsion polymerization techniques.

The following examples are given simply to illustrate this invention and not in any way to limit its scope:

EXAMPLE I

Four hundred grams of a high molecular weight emulsiontype polyvinyl chloride resin, of dispersion grade in particle size, sold under the trademark Geon 121, are heated at 75°–80°C. in the presence of the following mixed solvent system for 5 hours.

| 1820 H₂O | |
|---|---|
| 1725 Methanol | (cc's) |
| 975 Cyclohexanone | |

Upon completion of the reaction, the polymer is filtered and washed by slurring it with 800 cc methanol for 30 minutes at 50°C. The polymer is filtered and dried.

Microscopic evaluation of the particles before and after treatment revealed that there are large increases in particle size. The resultant particles exhibit the desired macroreticular structure. A photograph of them appears herein as FIG. XI.

| Bulk density | before = 41.7g./100ml. |
|---|---|
| | after = 28.2 |

A sample of this product is mixed with a conventional plasticizer, DOP. It is found that the resin absorbs 60 parts of DOP per 100 grams and still remains dry.

EXAMPLE II

A sample of 240 grams of polyvinyl chloride latex prepared by emulsion polymerization and consisting of 35.2% solids and containing 84 grams of polymer and 156 grams of water, is stirred for 3 hours at 75°C. with 260 cc H₂O, 416 cc methanol and 208 cc cyclohexanone.

The latex emulsion breaks and the CF resin precipitates and is filtered off. The pearl-like product is washed for 1 hour in hot 50°C. methanol, filtered and dried. Microscopic examination reveals the desired structure shown in FIG. I. This product is also shown in FIG. XII.

EXAMPLE III

A. Five parts of titanium dioxide pigment as a 24% by weight water dispersion are intimately mixed with 20 parts of polyvinyl chloride resin present in a 40% solids latex emulsion. The resin latex-pigment mixture is then blended with a mixed solvent composed of 8% cyclohexanone, 41% methanol and 51% water for 3 hours at 70°C. The resulting macroreticular resin-pigment composition is then filtered and dried. This dry powder, which contains 20% pigment, is allowed to absorb sufficient dioctyl phthalate plasticizer to fill the voids in its structure. The resulting plastisol remains a dry, free-flowing powder.

B. Five parts of a 24% water dispersion of blue pigment (phthalocyanine blue) are mixed with a PVC latex (40% solids) containing 20 parts of PVC. The resin latex-pigment mixture is then treated with 120 grams of a mixed solvent composed of 8% cyclohexanone, 41% methanol and 51% water. The mixture is heated for 3 hours at 70°C. The macroreticular resin-pigment mixture is then filtered and dried. This product is illustrated in FIG. XIII. To this pigmented blotter composition, which contains 20% active pigment, are added 25 grams of dioctyl phthalate plasticizer.

Both of these two "pigmentsols," or "instant plastisols" are ready for calendering operations.

EXAMPLE IV

A. To 1,000 grams of a PVC latex containing 25% solids are added 100 grams of acetone. The mixture is heated for 3 hours at 75°C. The resultant precipitated macroreticular resin is then cooled, filtered, washed with 4,000 grams of H₂O, filtered and air dried. This product is shown in FIGS. VI and XIV.

B. To 250 grams of the dry CF resin prepared above are added 200 grams of DOP. The CF blotter type resin evenly absorbs the plasticizer and remains a dry and free flowing powder. This dry blend can be stored for prolonged periods. A portion of it is dusted between glass plates and 100 p.s.i. pressure applied. The pressure causes the dry blend to shear into an even liquid plastisol. The plates, between which the liquefied plastisol is now sandwiched evenly, are placed in an oven at 350°F. for 20 minutes. A clear, strong, adhesive, glass laminate results. This material is suitable for safety type glass.

C. A sample of the CF resin prepared above is converted to a dry blend in a Hobart N-50 (B-beater stirrer) by charging the CF-PVC resin and slowly dripping in 60 parts by weight of DOP plasticizer per 100 parts of the resin, with stirring at No. 1 speed. The resultant dry powder is employed to laminate plywood, using two types of bonding techniques:

Pressure only:

Here the CF dry blend containing the plasticizer is sprinkled on one wood ply, the second wood ply is placed on top to form the lap joint, and the unit is put in the hot press at 350°F. at 167 p.s.i.

Shere Conversion:

Here the powdered plastisol is sprinkled on the wood surface followed by shear conversion (rubbing of the plies together to liquefy the dry blend) prior to bonding.

Data on bond strength is as follows:

|  | Bond Strength | Type of Failure |
| --- | --- | --- |
| Pressure bond method | 355 p.s.i. | 90% wood |
| Shear conversion method | 360 p.s.i. | 95% wood |

EXAMPLE V

A sample of the CF resin prepared in Example IV is milled twice (Mikropulverizer) to break up aggregates and evaluated as a dispersion grade resin for plastisol applications. Resin from this same latex is isolated using the conventional spray drying process followed by milling. Both resins are evaluated as dispersion grade resins relative to Geon 121 (also spary dried) by preparing plastisols from them using a Hobart N-50 mixer equipped with the B-type beater stirrer. The following formulation was used (in parts by weight): 100 resin, 100 dioctylphthalate, 1 tin mercaptide heat stabilizer.

The following table gives the results obtained in three comparative standard tests:

| Properties | CF 23 | Spray Dried 23 | Geon 121 |
| --- | --- | --- | --- |
| 1. Resin properties<br>% methanol extractables<br>(ASTM D 2222-63T) | 0.5 | 1.8 | 3.2 |
| 2. Plastisol properties<br>Brookfield viscosity (poise)<br>(ASTM D 1824-61T) | 14 | 119 | 15 |
| 3. Fused Film (350°F-10 min.-<br>20 mil.) Properties<br>Clarity (% haze)<br>(ASTM D 1003-61) | (clear)<br>0.8% | (haze)<br>25% | (haze)<br>30% |

It can be seen from the data that CF 23 by virtue of the coagulation process is excellently "cleaned up" and after milling functions as a dispersion grade resin. A photograph of this product appears herein as FIG. XV. For example, the new CF resin has vastly decreased methanol extractables (soap residues), excellent film clarity (improved to glass-like qualities, 0.8% haze), and plastisol viscosity comparable to Geon 121, indicating that the milled CF resin functions as a dispersion grade resin with low viscosity and excellent film clarity.

EXAMPLE VI

| Example VI | | |
| --- | --- | --- |
| PVC Latex | 100 | parts, dry weight |
| Water (including latex water) | 300 | " |
| Acetone | 20 | " |
| Sodium Chloride | 35 | " |
| Sodium Carbonate | 0.2 | " |

All of these reactants except the sodium chloride are charged into a reactor and heated under reflux with stirring for 2 hours at 75°C. At the end of that period the sodium chloride is added as a saturated aqueous solution (35.7 parts per 100 parts $H_2O$ - this water of solution being in addition to the 300 parts initially charged). Heating and stirring are continued 30 minutes longer, after which the reaction system is cooled to approximately 35°C. and the resin product filtered, washed free of salts and dried. This resin is illustrated in FIG. XX.

EXAMPLE VII

One hundred parts by weight (dry) of PVC latex, 40 parts of acetone, 24 parts of sodium sulfate (as a 10% aqueous solution), 0.2 part of sodium carbonate (as a 1% solution), 1 part of "Ionol" (a free radical scavenger used to reduce polymer decomposition during heat treatment) and enough additional water to make a total of 1000 parts of water are heated for 3 hours at 80°C. with agitation. The resulting resin, after recovery by filtration, water-washing and drying, had a DOp plasticizer absorption capacity of 170 phr. A photograph of this product appears as FIG. XXI herein.

We claim:

1. A reticulated resin structure in the form of a dry, free flowing powder, said resin structure comprising a plurality of vinyl polymer resin particles which are fused to one another at a plurality of contact points in a manner such that said resin structure has interstices between the thus fused particles thereof; said reticulated resin structure being prepared by means of a process which comprises intimately mixing an aqueous emulsion or suspension of discrete particles of a vinyl polymer and an at least partially water-miscible organic solvent system selected from the group consisting of ketones having from 3 to 6 carbon atoms, mixtures of such ketones with water-miscible lower alkanols of 1 to 5 carbons which are miscible with both the ketone and the water, dioxane, tetrahydrofuran, diemthylacetamide and mixtures of these, and heating the admixture to a temperature of at least 40°C. and for a time sufficient to soften said vinyl polymer particles without fully solubilizing said particles and fuse said particles together with one another into a resin having a reticulated structure with interstices between said fused particles and sufficient to provide fused particles having a surface area of at least $2M^2/g$ as measured by the BET method, a dry aggregate strength as measured by the Instron method of at least $\alpha$ - 20, a wet aggregate strength as measured by the modified Brookfield test of from about $\beta = 8$ to about $\beta = 130$ and a maximum bulk density by the ASTM-D1182 method of about 30 grams per 100 milliliters, and then separating the resulting reticulated resin structure.

2. The resin structure of claim 1, wherein said vinyl polymer is polyvinyl chloride.

3. The resin structure of claim 1, wherein said vinyl polymer is a copolymer of vinyl chloride and vinyl acetate.

4. The resin structure of claim 1, wherein in the process used for its preparation said solvent system also contains a water-soluble alkali metal salt electrolyte.

5. The resin structure of Claim 2, wherein in the process used for its preparation said solvent system is one part by volume of cyclohexanone with between 0 and 10 parts by volume of methanol.

6. The resin structure of claim 2, wherein in the process used for its preparation said solvent system is acetone.

7. The resin structure of claim 2, wherein in the process used for its preparation said solvent system is cyclohexaneone.

8. The resin structure of claim 1, wherein in the process used for its preparation an inert pigment is added to the system and a pigmented resin structure is separated.

9. A reticulated resin structure in the form of a dry, free flowing powder, said resin structure comprising a plurality of polyvinyl chloride resin particles which are fused to one another at a plurality of contact points in a manner such that said resin structure has interstices between the thus fused particles thereof; said reticulated resin structure being prepared by means of a process which comprises intimately mixing discrete particles of polyvinyl chloride in a solvent system consisting essentially of methanol, cyclohexanone, and water in the proportions encompassed within the miscible region which is present to the right of the 23°C. miscibility curve in the phase diagram of FIG. IV, heating the mixture at a temperature between about 40°C. and 100°C. for between about ½ and 5 hours to soften said polyvinyl chloride particles without fully solubilizing said particles sufficiently to fuse said particles together with one another forming a reticulated resin structure with interstices between said fused particles and sufficient to provide fused particles having a surface area of at least $2M^2/g$ as measured by the BET method, a dry aggregate strength as measured by the Instron method of at least $\alpha = 20$, a wet aggregate strength as measured by the modified Brookfield test of from about $\beta = 8$ to about $\beta = 130$, and a bulk density by the ASTM-D1182 method of less than 30 grams per 100 milliliters, and separating the resulting reticulated resin structure.

10. A reticulated resin structure in the form of a dry, free flowing powder said resin structure comprising a plurality of polyvinyl chloride resin particles which are fused to one another at a plurality of contact points in a manner such that said resin structure has interstices between the thus fused particle thereof; said reticulated resin being prepared by means of a process which comprises intimately mixing an aqueous latex of polyvinyl chloride particles in a solvent system comprising acetone and a water soluble alkali metal salt electrolyte selected from the group consisting of sodium sulfate and sodium chloride and heating the admixture to a temperature of about 50 and 85 degrees C. for from about 0.5 to 2 hours thus softening said polyvinyl chloride particles without fully solubilizing them, thereby fusing said particles with one another into a resin having a reticulated structure with interstices between the thus fused particles and then precipitating the resulting resin structure, said reticulated resin structure being characterized by a surface are of at least $2M^2/g$ as measured by the BET method, a dry aggregate strength as measured by the Instron method of at least $\alpha = 20$, a wet aggregate strength as measured by the modified Brookfield test of about $62 = 8$ to about $\beta = 130$, and a maximum bulk density by the ASTM-D1182 method of about 30 grams per 100 milliliters.

* * * * *

UNITED STATES PATENT AND TRADEMARK OFFICE
CERTIFICATE OF CORRECTION

PATENT NO. : 3,939,135
DATED : February 17, 1976
INVENTOR(S) : Jesse C. Hwa et al.

It is certified that error appears in the above-identified patent and that said Letters Patent are hereby corrected as shown below:

Col. 8, line 50

Change "confused" to -- cofused ""  ;

Col. 8, line 55

The period (.) after diameter should be a comma (,).

Col. 8, line 68

Change "½" to --α--;

Col. 9, line 57

Change "emulsiontype" to -- emulsion-type --;

Col. 11, line 25

Change "Shere" to -- Shear --;

UNITED STATES PATENT AND TRADEMARK OFFICE
CERTIFICATE OF CORRECTION

PATENT NO. : 3,939,135
DATED : February 17, 1976
INVENTOR(S) : Jesse C. H. Hwa et al.

It is certified that error appears in the above-identified patent and that said Letters Patent are hereby corrected as shown below:

Col. 12, line 44

Change "DOp" to -- DOP --.

Signed and Sealed this

Twenty-seventh Day of July 1976

[SEAL]

Attest:

RUTH C. MASON
Attesting Officer

C. MARSHALL DANN
Commissioner of Patents and Trademarks